United States Patent [19]

Taylor

[11] 3,930,245

[45] Dec. 30, 1975

[54] REMOTE MONITOR APPARATUS FOR METERS

[76] Inventor: Eugene M. Taylor, 3913 W. Windsor Ave., Phoenix, Ariz. 85009

[22] Filed: Feb. 5, 1975

[21] Appl. No.: 547,226

[52] U.S. Cl. .............................. 340/188 R; 340/203
[51] Int. Cl.² .......................................... G08C 19/16
[58] Field of Search ...................... 340/203, 188 R

[56] References Cited
UNITED STATES PATENTS

| | | |
|---|---|---|
| 2,995,738 | 8/1961 | Masek .................................. 340/203 |
| 3,646,539 | 2/1972 | Becker ................................. 340/203 |

*Primary Examiner*—Thomas B. Habecker
*Attorney, Agent, or Firm*—H. Gordon Shields

[57] ABSTRACT

Remote monitoring apparatus is disclosed for attachment to meters, such as water, gas, or electricity, which includes a single wire connection between the monitor and the meter to be monitored at a location remote from the meter.

4 Claims, 4 Drawing Figures

U.S. Patent  Dec. 30, 1975  3,930,245
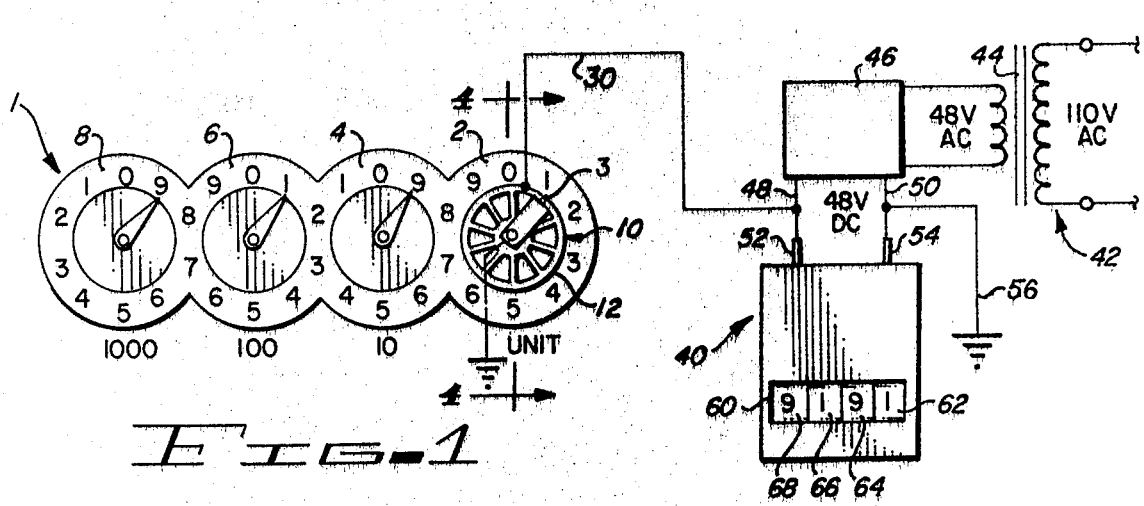
FIG-1
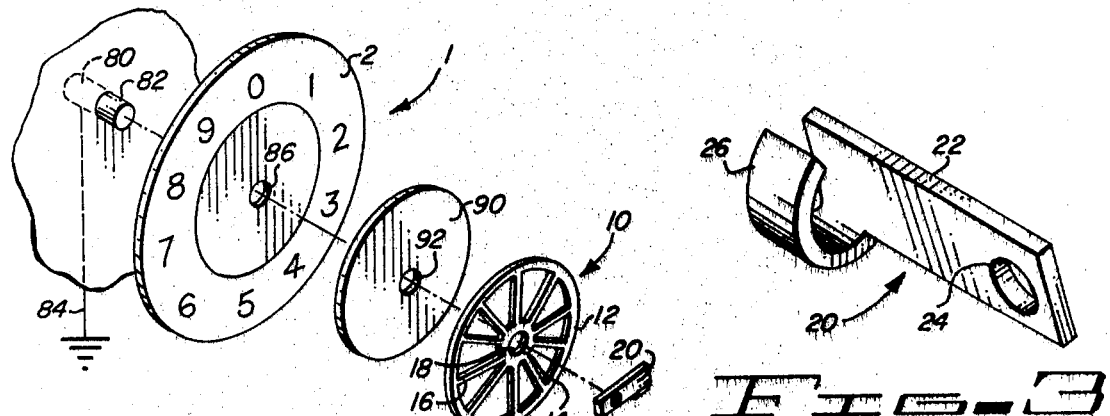
FIG-2
FIG-3
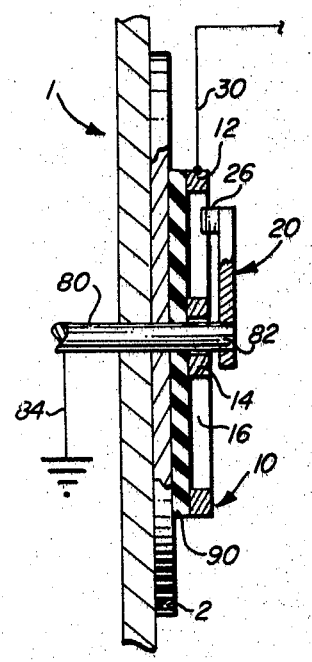
FIG-4

REMOTE MONITOR APPARATUS FOR METERS

BACKGROUND OF THE INVENTION

1. Field of the Invention

This invention relates to monitor apparatus, and, more particularly, to apparatus for monitoring meters at a location remote from the installation site of the meter.

2. Description of the Prior Art

Fences, dogs, and shrubbery are each potential and actual hazards encountered regularly by meter readers. For meter readers who must go into yards, the presence of dogs in the yards poses a potential safety hazard. For the home owner, it may be advantageous to have a dog in the yard as a discouragement for burglars, but at the same time the presence of such a dog poses a problem for meter readers.

In some instances, fences are built adjacent to homes, or between homes, in such a manner that a meter reader has extreme difficulty in reading a meter hidden behind such a fence. Moreover, the presence of shrubbery or trees adjacent to a meter, or located in such a manner as to hide or conceal a meter from an otherwise advantageous spot also poses problems for meter readers. For example, if it is possible for a meter reader to observe a meter from a distance, as through binoculars, or the like, the growth of shrubbery or trees between the remote observation site and the meter poses a problem of interfering with the line of sight of the meter reader. Another typical problem is simply the time required for a meter reader to enter a yard, observe a meter, and then go to the next yard, often requiring the opening and closing of gates with the attendant time expended.

The above enumerated problems have been recognized for many years, and many suggestions have been made, and various types of apparatus designed, to overcome the problem. For these reasons, remote monitors for monitors have been suggested and have been designed.

A typical example of the prior art is the monitor apparatus described in U.S. Pat. No. 2,671,211, dated Mar. 2, 1954. In this patent, a disc is secured to the operating shaft of the meter housing and rotates therewith. The periphery of the disc includes a pair of contact lens which make contact each half revolution, with a microswitch. The microswitch in turn increments a remote magnetic counter each time contact is made between the microswitch and the pins carried by the disc. The apparatus is designed for use with a liquid meter, with the disc being keyed to the operating shaft of the meter according to the liquid passing through the meter.

One of the problems of this type apparatus is that the pins on the disc must make physical contact with a pin of the microswitch, and there is accordingly mechanical movement as well as electrical circuits to be made and broken.

Another type of remote monitor apparatus is disclosed in U.S. Pat. No. 427,014, dated Apr. 29, 1890. In this patent, the rotating index finger of the meter is electrically connected to conductive material on the meter which in turn is connected to an electromagnet. As the index finger rotates, electrical contact is periodically made and broken with the electromagnet, which causes the circuit to the electromagnet to be made and broken. The electromagnet is in turn connected to a spring biased shaft which is in turn connected to an escapement type wheel. The wheel includes a plurality of teeth which correspond to the conductive segments on the meter. A lever is attached to a reciprocating piece which moves back and forth as the electromagnetic circuit is made and broken and each movement of the lever results in contact with the teeth on the wheel. Contact with the teeth in turn causes the wheel to rotate substantially the same as the index finger on the meter. Accordingly, the movement of the wheel then comprises a remote indicator for the meter.

The use of the electromagnet and the escapement type wheel, with its lever and reciprocating piece, is relatively cumbersome and subject to periodic wear and the like. Moreover, the making and the breaking of the electromagnetic circuit and the movement of the spring biased lever comprise electromechanical movements which are subject to wear and accordingly to replacement.

Another type apparatus for remote monitoring of meters is disclosed in U.S. Pat. No. 3,127,594, dated March 31, 1964. This apparatus uses a light source and a photo transistor which are in fixed relation to a rotary disc secured to a shaft. The rotary disc includes reflective segments separated by black segments which result in the light source periodically reflecting onto the photo transistor as the reflective segments rotate with the disc. Output from the phototransistor is transmitted to a pulse generating circuit which produces a voltage pulse suitable for counting and the output is totalized and transmitted to a mechanical counter.

There are several disadvantages of such apparatus, including the need for a light source, phototransistor, and electronic counting and totalizing circuitry in addition to a mechanical counter.

There are other prior art apparatus used for the remote monitoring of meters. However, most of them are relatively complicated and thus expensive. Moreover, the more complicated an apparatus is, the greater liklihood for a malfunction of some type.

SUMMARY OF THE INVENTION

The invention described and claimed herein comprises apparatus for monitoring a meter from a remote location. It includes a single wire connection between the meter and the remote monitor and a conductive circuit attached to the meter.

Among the objects of the present invention are the following:

To provide new and useful monitor apparatus;

To provide new and useful monitor apparatus for the remote monitoring of meters;

To provide new and useful meter monitor apparatus which is simple and inexpensive;

To provide new and useful meter monitor apparatus requiring only a single conductor between the meter to be monitored and the remote station from which the monitoring is accomplished; and To provide new and useful monitor apparatus including a wiper arm replacing an indicator dial from a meter clock face and a conductive circuit which is placed over a clock face which allows the original meter to be read as well as the remote indicator.

BRIEF DESCRIPTION OF THE DRAWING

FIG. 1 is a schematic representation of the apparatus of the present invention.

FIG. 2 is an exploded perspective view of a portion of the apparatus of FIG. 1.

FIG. 3 is a perspective view of a portion of the apparatus of FIG. 1.

FIG. 4 is a view in partial section of the apparatus of FIG. 1 taken generally along line 4—4 of FIG. 1.

DESCRIPTION OF THE PREFERRED EMBODIMENT

FIG. 1 is a schematic representation of the apparatus of the present invention illustrating its employment with a dial of a meter 1. Four dials or clock faces are shown in FIG. 1, a unit dial 2, a ten dial 4, a hundred dial 6, and a thousand dial 8. The clock face of each dial includes ten digits, 0 through 9, and an indicator hand or pointer which moves sequentially around the dial or clock face. Each of the dials is connected by appropriate gearing to the adjacent dial. One complete revolution of the indicator hand or pointer of the unit dial, as for example from zero through one, two . . . nine and back to zero will increment the ten dial one unit, as for example from zero to one. One complete revolution of the hand of the ten dial will in turn increment the hundred dial hand one unit, and a complete revolution of the hand of the hundred dial will in turn increment the thousand dial hand one numeral or unit. Accordingly, there is a multiple or factor of ten between each of the adjacent dials.

The unit dial is the dial with which the present invention is concerned. The unit dial or clock face 2 includes a hand or pointer 3, only the tip of which is shown in FIG. 1. The hand is spaced apart from the clock face of the meter.

A conductive wheel 10 is shown secured to the clock face of the unit dial between the clock face and the hand or pointer 3. The wheel includes an outer conductive rim portion 12, which extends about the exterior periphery of the wheel, an interior conductive hub portion, and a plurality of spokes extending between the hub and the rim. There is one spoke for each digit, or a total of ten spokes. The spokes are aligned with the digits on the clock face of the dial. A wiper is secured to the hand 3 and provides electric contact with the spokes of the wheel as the hand 3 rotates. If desired, and as will be illustrated below, the hand 3 may be removed and the wiper 20 inserted in its place.

As is common with all meters, the meter housing and the dials are grounded, and accordingly the hand or pointer 3 and the wiper is grounded through the meter. The wheel 10, however, is insulated from the dial and accordingly is not grounded. Instead, a conductor 30 extends from the wheel 10 to counter apparatus 40.

The counter 40 comprises a resettable type register which is incremented by grounding pulses resulting from contact between the wiper 20 and the spokes of the wheel.

The counter receives its electrical power from a typical 110 volt alternating current line source 42 which is transformed down to 48 volts by a transformer 44, and the 48 alternating current is then rectified by a rectifier 46 to provide a 48 volt direct current input to the counter. A pair of conductors 48 and 50 extend from the rectifier 46 to, respectively, terminals 52 and 54 of the counter 40. A conductor 56 extends from the conductor 50 to an appropriate ground. Accordingly, terminal 54 of the counter 40 is grounded.

The counter 40, which is remotely located with respect to the meter, and only connected thereto by a single conductor, conductor 30, includes a dial 60 which has, as shown, at least four digit counters on its face, comparable to the indicated four digits associated with the pointers of the respective dials in the meter 1. That is, there is a units counter 62, a tens counter 64, a hundreds counter 66, and a thousands counter 68. Each of the respective counters is related to the adjacent counter by a factor of ten, substantially the same as the respective dials in the meter.

FIG. 2 is an exploded perspective view of a portion of the apparatus of FIG. 1, illustrating the connection of the wheel and wiper to the meter. The meter 1 includes a shaft 80 which is directly connected to the internal apparatus of the meter, whatever type of meter it may be, and which rotates in response to the meter mechanism to provide the appropriate counting of whatever is being metered, such as electricity, water, gas, or the like. The shaft 80 includes a splined portion 82 which receives the hand, such as hand 3, (see FIG. 1) or, in the alternative, and as is illustrated herein, receives a wiper 20. The shaft 80 is illustrated as schematically grounded, as by a conductor 84. As explained above, the meters are grounded in order to prevent an accident of some type, and conductor 84 is accordingly a schematic representation of such grounded situation. The units dial 2, which comprises a clock face, is disposed on the meter 1 about the shaft 80. The dial or clock face 2 does not move, but rather is secured in place on the meter. The shaft 80 extends through the dial or clock face 2 through an aperture 86 therein. The aperture is centrally located with respect to the dial.

An insulative disc 90 is secured to the dial or clock face about the aperture 90. The insulative disc includes an aperture 92 which is substantially coextensive and coaxial with the aperture 86. The shaft 80 extends also through the aperture 92 in the insulative disc 90. The insulative disc 90 is appropriately secured to the clock face inwardly of the numerals. That is, the diameter of the insulative disc is less than the diameter of the clock face with respect to the numerals, so that the disc will not cover any of the numerals. Accordingly, in addition to the remote metering capabilities, the meter may also be viewed directly.

The wheel 10 is in turn secured to the insulative disc 90 with a plurality of spokes 16 extending outwardly from a hub 14 to the rim 12 and aligned with, and corresponding to, the numerals on the dial 2. The wheel 10 includes a central aperture 18 which is also coaxial with the apertures 86 and 92 of the dial and insulative disc, respectively, but is slightly larger in diameter so as to allow the shaft 80 to extend therethrough without any electrical contact therewith.

After the insulative disc and wheel have been secured to the clock face, the wiper 20 is then secured to the splined portion 82 of the shaft 80. Rotation of the shaft results in rotation of the wiper which makes electrical contact with the spokes 16 of the wheel as the shaft 80 rotates. Since the wiper is electrically connected to ground 84 through the shaft 80, and the wheel 10 is electrically connected by a conductor 30 (see FIG. 1) to the remote counter, the counter will be shorted to ground when the wiper 20 contacts, sequentially, each of the spokes 16. This will result in the incrementing of the counter when the wiper 20 contacts, in sequence, each of the spokes.

FIG. 3 is a perspective view of the wiper 20 of the present invention. The wiper 20 includes a plate 22, which corresponds to the hand or indicator arm 3 (see FIG. 1) of the meter. An aperture 24 extends through the plate at one end thereof. The aperture 24 is preferably internally splined to match the splines on the splined portion 82 of the shaft 80. At the opposite end of the plate 22 from the aperture 24 is a brush portion 26. The brush 26 is connected to the plate, and it comprises a smoothly arcuate portion in which the length of the arcuate portion is generally aligned with the longitudinal axis of the plate 22. That is, the axis or axial center of the curvature of the arc is aligned, or is parallel, to the longitudinal axis of the plate 22. This provides for a relatively smooth contact with each of the spokes as the wiper rotates over the wheel 10. The wiper, of course, is made of conductive material.

In actual practice, as the brush portion 26 of the wiper contacts each spoke, the counter 40 (see FIG. 1) increments itself one half portion and when the brush of the wiper moves off the spoke, the counter completes the incrementing of the sequential count number. That is, the number of the counter increments itself partially during the initial grounding, and when the grounding pulse is removed from the counter, the counter completes the incrementing of the number.

FIG. 4 is a view in partial section of the apparatus of FIG. 1 taken generally along line 4—4 of FIG. 1. It shows the apparatus in side view, with a schematic representation of the electrical system as the apparatus is in use. The shaft 80 of the meter 1 is shown schematically grounded through a grounding conductor 84. The clock face or dial 2 is shown secured to the housing of the meter 1. An insulative disc 90 is disposed between the clock face 2 and the conductive wheel 10 so as to electrically insulate the wheel 10 from the clock face and the meter 1.

The conductive wheel 10 includes its rim 12, which is shown connected to a conductor 30. The conductor in turn leads to the counter 40, as illustrated in FIG. 1. The rim 12 is connected to the hub 14 by a plurality of spokes 16. The spokes are accordingly electrically connected to each other through the hub and the rim. The wiper 20 is secured to the shaft 80 and rotates therewith. As the brush 26 contacts each of the spokes, sequentially, the wheel 10 is connected to ground through the shaft 80 and ground 84. This in turn grounds conductor 30 which is connected to the counter, (see FIG. 1). The grounding of the counter results in its being incremented, as discussed in detail above.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operating requirements, without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Apparatus for the remote monitoring of a meter having at least a single clock face with a plurality of numerals thereon and a rotatable pointer secured to a shaft, comprising, in combination:
    an insulator disposed on the clock face;
    conductive wheel means secured to the insulator, including a plurality of spaced apart spokes corresponding to the numerals on the clock face;
    wiper means secured to the shaft and making electrical contact with the spokes of the conductive wheel means in response to rotation of the shaft; and
    remote indicator means including dial means indicating electrical contact between the wiper means and the conductive wheel means.

2. The apparatus of claim 1 in which the conductive wheel means includes an inner hub, an outer rim, and the plurality of spokes extends between the hub and the rim.

3. The apparatus of claim 2 in which the wiper means includes a plate, an aperture extending through the plate for securing the plate to the shaft of the meter, and a brush extending from the plate for making electrical contact with the spokes of the conductive wheel means.

4. The apparatus of claim 3 in which the remote indicator means includes a conductor extending between the conductive wheel means and the dial means for transmitting an indication of electrical contact between the wiper means and the conductive wheel means.

* * * * *